(12) United States Patent
Wu et al.

(10) Patent No.: US 12,278,361 B2
(45) Date of Patent: Apr. 15, 2025

(54) NEGATIVE ELECTRODE PLATE, SECONDARY BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Qifan Wu, Ningde (CN); Ming Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/941,209

(22) Filed: Nov. 8, 2024

(65) Prior Publication Data

US 2025/0070126 A1 Feb. 27, 2025

Related U.S. Application Data

(63) Continuation of application No. PCT/CN2022/105621, filed on Jul. 14, 2022.

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/587* (2013.01); *H01M 4/622* (2013.01); *H01M 4/64* (2013.01);
(Continued)

(58) Field of Classification Search
None
See application file for complete search history.

(56) References Cited

U.S. PATENT DOCUMENTS

2003/0157014 A1* 8/2003 Wang ................. C01B 32/05
423/445 R
2014/0227522 A1* 8/2014 Sasaki .................. H01M 4/583
252/182.1
(Continued)

FOREIGN PATENT DOCUMENTS

CN 1597502 A 3/2005
CN 104584286 A 4/2015
(Continued)

OTHER PUBLICATIONS

The World Intellectual Property Organization (WIPO) International Search Report and Written Opinion for PCT/CN2022/105621 Mar. 29, 2023 11 Pages (including translation).

*Primary Examiner* — Robert S Carrico
(74) *Attorney, Agent, or Firm* — ANOVA LAW GROUP, PLLC

(57) ABSTRACT

A negative electrode plate includes: a negative electrode current collector, and a negative electrode film layer located on at least one surface of the negative electrode current collector and including first and second negative electrode active material particles. The first negative electrode active material particles includes adsorption holes and have a tap density of 0.4 g/cm$^3$-1.4 g/cm$^3$. The second negative electrode active material particles have a layered structure and a tap density of 0.05 g/cm$^3$-1.5 g/cm$^3$. Based on the total mass of the first and second negative electrode active material particles, a mass percentage of the first negative electrode active material particles is in the range of 70%-95%, and a mass percentage of the second negative electrode active material particles is in the range of 5%-30%. A compaction density PD of the negative electrode film layer satisfies: 0.8 g/cm$^3 \leq$ PD $\leq$ 1.3 g/cm$^3$.

15 Claims, 7 Drawing Sheets

(51) Int. Cl.
   *H01M 4/587*   (2010.01)
   *H01M 4/62*    (2006.01)
   *H01M 4/64*    (2006.01)
   *H01M 10/052*  (2010.01)

(52) U.S. Cl.
   CPC .... *H01M 10/052* (2013.01); *H01M 2004/021* (2013.01); *H01M 2004/027* (2013.01)

(56) References Cited

U.S. PATENT DOCUMENTS

2015/0287546 A1* 10/2015 Xi .......................... H01G 11/38
                                                        29/25.41
2020/0020947 A1   1/2020  Choi et al.
2020/0266422 A1   8/2020  Lee et al.
2021/0273224 A1   9/2021  Hoshi et al.

FOREIGN PATENT DOCUMENTS

| CN | 105810900 A | 7/2016 |
| CN | 110289393 A | 9/2019 |
| CN | 110690436 A | 1/2020 |
| CN | 112968169 A | 6/2021 |

* cited by examiner

NEGATIVE ELECTRODE PLATE, SECONDARY BATTERY, BATTERY MODULE, BATTERY PACK, AND ELECTRICAL DEVICE

CROSS-REFERENCE TO RELATED APPLICATION

This application is a Continuation of International Application No. PCT/CN2022/105621 filed on Jul. 14, 2022, which is incorporated herein by reference in its entirety.

TECHNICAL FIELD

The present application relates to the field of battery technology, in particular to a negative electrode plate, a secondary battery, a battery module, a battery pack, and an electrical device.

BACKGROUND

As energy and environment issues are increasingly prominent, the new energy industry has received more and more attention. Lithium-ion batteries have been widely used as an important novel energy storage device in recent years due to their characteristics such as high energy density and good cycle performance. However, due to the scarcity of active material resources related to the lithium-ion batteries, the batteries are always high-cost and face severe problems such as resource depletion. Therefore, it is needed to develop other low-cost metal ion secondary battery systems.

Sodium-ion batteries have become a popular research direction in recent years due to their advantages such as low cost, abundant resources, and similar manufacturing processes to the lithium-ion batteries.

However, due to the limitation by voltage plateaus and low gram capacities of existing positive and negative electrode materials for the sodium-ion batteries, there is always a significant gap in energy density between the sodium-ion batteries and the lithium-ion batteries, making it impossible to truly achieve commercial applications of sodium-ion batteries. Moreover, the initial coulombic efficiency and rate performance of the sodium-ion batteries are also required to be improved.

SUMMARY

The present application is made in view of the foregoing topic and aims to provide a negative electrode plate, a secondary battery, a battery module, a battery pack, and an electrical device to effectively improve energy density and rate performance of sodium-ion batteries.

A first aspect of the present application provides a negative electrode plate, including: a negative electrode current collector; and a negative electrode film layer which is located on at least one surface of the negative electrode current collector and includes first negative electrode active material particles and second negative electrode active material particles, the first negative electrode active material particles including a plurality of adsorption holes and having a tap density of 0.4 g/cm$^3$-1.4 g/cm$^3$, and optionally 0.6 g/cm$^3$-1.0 g/cm$^3$, the second negative electrode active material particles having a layered structure and having a tap density of 0.05 g/cm$^3$-1.5 g/cm$^3$, wherein based on the total mass of the first negative electrode active material particles and the second negative electrode active material particles, a mass percentage of the first negative electrode active material particles is in the range of 70%-95%, optionally in the range of 80%-95%; a mass percentage of the second negative electrode active material particles is in the range of 5%-30%, optionally in the range of 5%-10%, and a compaction density PD of the negative electrode film layer satisfies: 0.8 g/cm$^3 \leq$ PD $\leq$ 1.3 g/cm$^3$, and optionally 1.0 g/cm$^3 \leq$ PD $\leq$ 1.2 g/cm$^3$.

The first negative electrode active material particles include a plurality of adsorption pores, and have a tap density within the above proper ranges, so the interior of the first negative electrode active material particles can still have an enough quantity of adsorption pores after cold pressing. As a result, Na$^+$ can be smoothly adsorbed by and desorbed from the first negative electrode active material particles in a charge-discharge process. Additionally, the second negative electrode active material particles have a layered structure. During the cold pressing process, on one hand, the second negative electrode active material particles may fill the gaps among multiple first active material particles, and on the other hand, they may act on the surface of the first negative electrode active material particles by utilizing a sliding effect of the layered structure, so that the negative electrode active material particles may closely contact each other during the cold pressing process, which increases the powder compaction density of the negative electrode active material particles and further enables the negative electrode film layer, after cold pressing, to have an appropriate compaction density. As a result, the negative electrode active material particles in the negative electrode film layer are in close contact, which can improve transport performance of electrons and sodium ions in the negative electrode plate and then improve rate performance of a sodium-ion battery. Furthermore, the second negative electrode active material particles have a layered structure. Compared to the first negative electrode active material particles, the second negative electrode active material particles have limited ability to adsorb and intercalate sodium ions. The content of the first negative electrode active material particles and the second negative electrode active material particles within the aforementioned suitable range can further ensure that the sodium-ion battery has a high energy density.

In some embodiments, the first negative electrode active material particles have a median particle size D50 of 1 μm-50 μm, and optionally 5 μm-10 μm.

The first negative electrode active material particles having a median particle size within the aforementioned suitable range, on one hand, may increase the production capacity of the negative electrode plate; on the other hand, it may ensure that the first negative electrode active material particles have an appropriate amount of active sites on their surface, thereby enhancing the coulombic efficiency of sodium-ion batteries. In addition, the first negative electrode active material particles have a suitable median particle size, which not only allows for good transport performances of electrons and sodium ions within the first negative electrode active material particle but also results in a lower particle interface resistance for the first negative electrode active material particles. Therefore, the negative electrode plate of the present application, when used in sodium-ion batteries, allows the sodium-ion batteries to possess high energy density, high coulombic efficiency, good rate performance, and cycle performance.

In some embodiments, the negative electrode current collector has a percentage of elongation E satisfying: 0.1% $\leq$ E $\leq$ 0.2%, and optionally 0.1% $\leq$ E $\leq$ 0.15%.

In the present application, by combining the first negative electrode active material particles with the second negative electrode active material particles and utilizing the sliding function of the second negative electrode active material particles, it is possible to make the negative electrode active material particles closely contact each other during a cold pressing process, thereby enabling the negative electrode active material particles to have a high powder compaction density. Therefore, compared to negative electrode active material particles with a lower compaction density, the negative current collector of the present application can have a lower elongation percentage under the same cold pressing parameters, and thus can maintain good electrical conductivity and mechanical strength.

In some embodiments, a coating weight CW of the negative electrode film layer on single side may be 2 mg/cm$^2$-13 mg/cm$^2$.

The coating weight of the negative electrode film layer on single side within the above proper range not only may enable electrons and sodium ions to have proper migration paths in the negative electrode plate, but also enable the negative electrode plate to have a proper capacity. Therefore, using the negative electrode plate of the present application in a sodium-ion battery can allow the sodium-ion battery to have good rate performance and high energy density.

In some embodiments, the negative electrode film layer satisfies: 30%≤P≤60%, and optionally 45%≤P≤55%, where P=[1−CW/(d*PA)]*100%, d=$d_0$/(1+E), CW represents a coating weight of the negative electrode film layer on single side, PA represents a true density of the negative electrode film layer on single side, E represents a percentage of elongation of the negative electrode current collector; and $d_0$ represents a thickness of the negative electrode film layer on single side.

When the parameter P of the negative electrode film layer satisfies the above conditions, it may be considered that an increase in the compaction density of the negative electrode film layer is mainly implemented by a sliding function of the second negative electrode active material particles in the cold pressing process, which has no significant impact on the porosity of the negative electrode film layer. As a result, the compaction density of the negative electrode film layer is increased, and infiltration of the negative electrode film layer by an electrolytic solution can be maintained, thereby ensuring that the secondary battery has high energy density and good rate performance.

In some embodiments, the first negative electrode active material particles are selected from one or more of hard carbon, soft carbon, and mesophase carbon microbeads; and the second negative electrode active material particles are selected from one or more of artificial graphite, natural graphite, and graphene. The aforementioned first negative electrode active material particles and second negative electrode active material particles may enable the negative electrode film layer to have a high compaction density and excellent electron conductivity, and when applied in sodium-ion batteries, may enable the sodium-ion batteries to possess a high compaction density and good cycle performance.

In some embodiments, the first negative electrode active material particles include one or more of irregularly shaped first negative electrode active material particles, spherical first negative electrode active material particles, or quasi-spherical first negative electrode active material particles. When the first negative electrode active material particles have the aforementioned morphologies, they may enhance flexibility of the process for the negative electrode plate and allow the sodium-ion batteries to have a high energy density.

In some embodiments, the first negative electrode active material particles include one or more of irregularly shaped hard carbon particles, spherical hard carbon particles, or quasi-spherical hard carbon particles. When the first negative electrode active material particles are selected from hard carbon particles having the aforementioned morphologies, they may enable the negative electrode active material particles to have a low cost and high theoretical gram capacity, thereby enhancing energy density, rate performance, and cycle stability of the sodium-ion batteries.

In some embodiments, the compaction density PD of the negative electrode film layer on single side satisfies: 1.0 g/cm$^3$≤PD≤1.2 g/cm$^3$; and the negative electrode film layer satisfies: 30%≤P≤60%, and optionally 45%≤P≤55%, where P=[1−CW/(d*PA)]*100%, d=$d_0$/(1+E), CW represents a coating weight of the negative electrode film layer on single side, PA represents a true density of the negative electrode film layer on single side, E represents a percentage of elongation of the negative electrode current collector; and $d_0$ represents a thickness of the negative electrode film layer on single side.

When the parameter P of the negative electrode film layer satisfies the above condition, it may be considered that an increase in the compaction density of the negative electrode film layer is mainly implemented by a sliding function of the second negative electrode active material particles in the cold pressing process. Therefore, the negative electrode film layer can have a high compaction density, even without deformation or sliding of the hard carbon particles. As a result, the hard carbon materials can be applied to sodium-ion batteries, so that the sodium-ion batteries have a wide application prospect.

In some embodiments, the negative electrode film layer further includes a flexible binder, the flexible binder includes one or more of a styrene-acrylic emulsion, a copolymer of vinylidene fluoride and tetrafluoroethylene, a copolymer of vinylidene fluoride and hexafluoropropylene, a copolymer of vinylidene fluoride and acrylate, polytetrafluoroethylene, nitrile butadiene rubber, and hydrogenated nitrile butadiene rubber. The negative electrode film layer including the above flexible binder can have good flexibility. As a result, the negative electrode film layer can have smaller stress in the cold pressing process, the negative electrode active material particles are prone to aggregation, and the negative electrode plate can have a lower elongation percentage. As a result, the compaction density of the negative electrode film layer can be further increased, thereby increasing the energy density of the sodium-ion batteries.

In some embodiments, based on the total mass of the negative electrode film layer, the negative electrode film layer comprises: 80 wt % to 97 wt % of negative electrode active material particles, 0 wt % to 5 wt % of a conductive agent, 2 wt % to 10 wt % of a binder, and 0.5 wt % to 5 wt % of a dispersant, wherein the negative electrode active material particles include the first negative electrode active material particles and the second negative electrode active material particles. The negative electrode film layer includes the aforementioned components, and the content of each component is within the aforementioned suitable range, which can ensure that the negative electrode film layer has a high compaction density and good transport performance of electrons and sodium ions. Thus, the negative electrode plate of the present application, when used in sodium-ion batteries, can allow the sodium-ion batteries to have high energy density and good cycle performance.

A second aspect of the present application provides a secondary battery, including the negative electrode plate in the first aspect of the present application.

The secondary battery of the present application includes the negative electrode plate in the first aspect of the present application, and as a result, it can have a high energy density and good rate performance.

A third aspect of the present application provides a battery module, including the secondary battery in the second aspect of the present application.

A fourth aspect of the present application provides a battery pack, including the battery module in the third aspect of the present application.

A fifth aspect of the present application provides an electrical device, including at least one of the secondary battery in the second aspect of the present application, the battery module in the third aspect of the present application, or the battery pack in the fourth aspect of the present application.

The battery module, the battery pack, and the electrical device of the present application include the secondary battery, and therefore, have at least the same advantages as the secondary battery.

Figure 1:
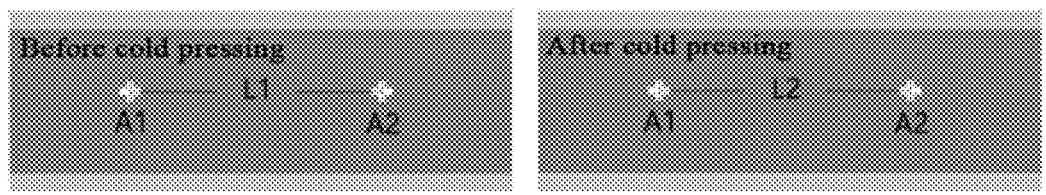
FIG. 1 is a schematic diagram of a test of the percentage of elongation of a negative electrode current collector according to an embodiment of the present application.

REFERENCE NUMERALS 1 battery pack; 2 upper box; 3 lower box; 4 battery module; 5 secondary battery; 51 shell; 52 electrode assembly; 53 cover plate.

DETAILED DESCRIPTION

Hereinafter, embodiments of a negative electrode plate, a secondary battery, a battery module, a battery pack, and an electrical device of the present application will be described in detail properly with reference to the accompanying drawings. However, unnecessary detailed description may be omitted. For example, detailed description of well-known matters and repeated description of actually identical structures are omitted. This prevents the following description from becoming unnecessarily lengthy and facilitates understanding of those skilled in the art. In addition, the accompanying drawings and the following description are provided for those skilled in the art to fully understand the present application and are not intended to limit the subject matter of the claims.

The "range" disclosed in the present application is defined in the form of a lower limit and an upper limit. A given range is defined by selecting a lower limit and an upper limit, and the selected lower limit and upper limit define the boundaries of a particular range. The range defined in this way can include or exclude end values, and can be combined arbitrarily, that is, any lower limit can be combined with any upper limit to form a range. For example, if a range of 60-120 and 80-110 is listed for a specific parameter, it is understood that a range of 60-110 and 80-120 is also expected. In addition, if 1 and 2 as minimum range values are listed, and if 3, 4 and 5 as maximum range values are listed, the following ranges can all be expected: 1-3, 1-4, 1-5, 2-3, 2-4 and 2-5. In the present application, unless otherwise specified, the numerical range "a-b" represents an abbreviation of any combination of real numbers between a and b, where both a and b are real numbers. For example, the numerical range "0-5" represents all real numbers "0-5" listed herein, and "0-5" is only an abbreviation of a combination of these values. In addition, when a parameter is expressed as an integer≥2, it is equivalent to disclosing that the parameter is, for example, an integer 2, 3, 4, 5, 6, 7, 8, 9, 10, 11, 12, etc.

Unless otherwise specified, all the embodiments and optional embodiments of the present application can be combined with each other to form new technical solutions.

Unless otherwise specified, all the technical features and optional technical features of the present application can be combined with each other to form new technical solutions.

Unless otherwise specified, all the steps of the present application can be carried out sequentially or randomly, and in some embodiments carried out sequentially. For example, the method includes steps (a) and (b), which represents that the method may include steps (a) and (b) performed sequentially, or may include steps (b) and (a) performed sequentially. For example, the method may further include step (c), which represents that step (c) may be added to the method in any order, for example, the method may include steps (a), (b) and (c), or steps (a), (c) and (b), or steps (c), (a) and (b).

Unless otherwise specified, the expressions "comprise" and "include" mentioned in the present application are open-ended. For example, the expression "comprise" and "include" may or may not comprise or include other components that are not listed.

Unless otherwise specified, in the present application, the term "or" is inclusive. For example, the phrase "A or B" represents "A, B, or both A and B". More specifically, any of the following conditions satisfies the condition "A or B": A is true (or exists) and B is false (or does not exist); A is false (or does not exist) and B is true (or exists); or both A and B are true (or exist). In this disclosure, the phrases "at least one of A, B, and C" and "at least one of A, B, or C" both mean only A, only B, only C, or any combination of A, B, and C.

In order to improve energy density and rate performance of sodium-ion batteries, it is important to select negative electrode active materials for the sodium-ion batteries.

After in-depth research, the inventors have found that, in a charge process a hard carbon negative electrode of a sodium-ion battery undergoes $Na^+$ intercalation or adsorption. When negative electrode active material particles with a plurality of adsorption pores are selected for the negative electrode of the sodium-ion battery, $Na^+$ intercalation or adsorption occurs in a charge process, thereby ensuring capacity exertion of the negative electrode. However, after the negative electrode active material particles with a lot of adsorption pores are prepared into a negative electrode film layer, the compaction density of the negative electrode film layer decreases, which not only affects the energy density of the sodium-ion battery, but also extends transport paths of electrons and sodium ions in a negative electrode plate, thereby reducing transport performance of electrons and sodium ions in the negative electrode plate and then deteriorating rate performance of the sodium-ion battery.

On this basis, the inventors provide a negative electrode plate, a secondary battery, a battery module, a battery pack, and an electrical device after deep thinking and many experiments.

Negative Electrode Plate

A first aspect of the present application provides a negative electrode plate, which includes a negative electrode current collector and a negative electrode film layer. The negative electrode film layer is located on at least one surface of the negative electrode current collector, the negative electrode film layer includes first negative electrode active material particles and second negative electrode active material particles, the first negative electrode active material particles include a plurality of adsorption holes and have a tap density of 0.4 g/cm$^3$-1.4 g/cm$^3$. The second negative electrode active material particles have a layered structure and have a tap density of 0.05 g/cm$^3$-1.5 g/cm$^3$. Based on the total mass of the first negative electrode active material particles and the second negative electrode active material particles, a mass percentage of the first negative electrode active material particles is in the range of 70%-95%; a mass percentage of the second negative electrode active material particles is in the range of 5%-30%. A compaction density PD of the negative electrode film layer satisfies: 0.8 g/cm$^3$≤PD≤1.3 g/cm$^3$, 0.8 g/cm$^3$≤PD≤1.2 g/cm$^3$, 0.8 g/cm$^3$≤PD≤1.1 g/cm$^3$, 0.8 g/cm$^3$≤PD≤1.0 g/cm$^3$, 1.0 g/cm$^3$≤PD≤1.3 g/cm$^3$, 1.0 g/cm$^3$≤PD≤1.2 g/cm$^3$ or 1.0 g/cm$^3$≤PD≤1.1 g/cm$^3$. Optionally, the tap density of the first negative electrode active material particles is in the range of 0.6 g/cm$^3$-1.0 g/cm$^3$. Optionally, based on the total mass of the first negative electrode active material particles and the second negative electrode active material particles, a mass percentage of the first negative electrode active material particles is in the range of 80%-95%; a mass percentage of the second negative electrode active material particles is in the range of 5%-20%. More optionally, based on the total mass of the first negative electrode active material particles and the second negative electrode active material particles, a mass percentage of the first negative electrode active material particles is in the range of 90%-95%; a mass percentage of the second negative electrode active material particles is in the range of 5%-10%.

Although the mechanism is not yet clear, the inventors of the present application have unexpectedly found: the negative electrode film layer of the present application includes the first negative electrode active material particles and the second negative electrode active material particles that satisfy the above conditions, and the combination of the two types of negative electrode active material particles can enable the negative electrode film layer to have a high compaction density As a result, using the negative electrode plate of the present application in a sodium-ion battery can enable the sodium-ion battery to have a high energy density and good rate performance.

Specifically, without being bound by any theory or explanation, the first negative electrode active material particles include a plurality of adsorption pores, and have a tap density within the above proper range, so the interior of the first negative electrode active material particles can still have an enough quantity of adsorption pores after cold pressing. As a result, Na$^+$ can be smoothly adsorbed by and desorbed from the first negative electrode active material particles in a charge discharge process. Additionally, the second negative electrode active material particles have a layered structure. During the cold pressing process, on one hand, the second negative electrode active material particles may fill the gaps among multiple first active material particles, and on the other hand, they may act on the surface of the first negative electrode active material particles by utilizing a sliding effect of the layered structure, so that the negative electrode active material particles may closely contact each other during the cold pressing process, which increases the powder compaction density of the negative electrode active material particles and further enables the negative electrode film layer, after cold pressing, to have an appropriate compaction density. As a result, the negative electrode active material particles in the negative electrode film layer are in close contact, which can improve transport performance of electrons and sodium ions in the negative electrode plate and then improve rate performance of a sodium-ion battery. Furthermore, the second negative electrode active material particles have a layered structure. Compared to the first negative electrode active material particles, the second negative electrode active material particles have limited ability to adsorb and intercalate sodium ions. The content of the first negative electrode active material particles and the second negative electrode active material particles within the aforementioned suitable range can further ensure that the sodium-ion battery has a high energy density.

In some embodiments, the first negative electrode active material particles have a median particle size D50 of 1 μm-50 μm, and optionally 5 μm-10 μm. For example, D50 can be 1 μm, 3 μm, 5 μm, 8 μm, 10 μm, 15 μm, 20 μm, 25 μm, 35 μm, 45 μm, 50 μm, or within any range composed of the above values.

Without intention to be bound by any theory or explanation, the first negative electrode active material particles having a median particle size within the aforementioned suitable range, on one hand, may reduce the difficulty in preparing the first negative electrode active material particles, thereby increasing the production capacity of the negative electrode plate: on the other hand, it may possess an appropriate specific surface area, which allows the first negative electrode active material particles to have an appropriate amount of active sites on their surface, thereby enhancing the coulombic efficiency of sodium-ion batteries. In addition, the first negative electrode active material particles have a suitable median particle size, which not only allows for good transport performances of electrons and sodium ions within the first negative electrode active material particle but also results in a lower particle interface resistance for the first negative electrode active material particles. Therefore, the negative electrode plate of the present application, when used in sodium-ion batteries, allows the sodium-ion batteries to possess high energy density, high coulombic efficiency, good rate performance, and cycle performance.

In some embodiments, a percentage of elongation E of the negative electrode plate may satisfy: 0.1%≤E≤0.2%, and optionally 0.1%≤E≤0.15%. For example, E may be 0.1%, 0.12%, 0.15%, 0.18%, 0.2%, or within a range of any of the above values.

Without being bound by any theory or explanation, in the present application, by matching the first negative electrode active material particles with the second negative electrode active material particles and utilizing the sliding function of the second negative electrode active material particles, it is possible to make the negative electrode active material particles closely contact each other during a cold pressing process, thereby enabling the negative electrode active material particles to have a high powder compaction density. Therefore, compared to negative electrode active material particles with a lower compaction density, the negative current collector of the present application can have a lower elongation percentage under the same cold pressing parameters, and thus can maintain good electrical conductivity and mechanical strength.

In some embodiments, a coating weight CW of the negative electrode film layer on single side may be 2 mg/cm$^2$-13 mg/cm$^2$, and optionally 5 mg/cm$^2$-12 mg/cm$^2$. For example, CW may be 2 mg/cm$^2$, 5 mg/cm$^2$, 8 mg/cm$^2$, 10 mg/cm$^2$, 12 mg/cm$^2$, 13 mg/cm$^2$, or within a range of any of the above values.

The coating weight of the negative electrode film layer on single side may represent solid component content of negative electrode slurry coated on the negative electrode film layer on single side per unit area, and may be numerically equal to an areal density of the negative electrode film layer on single side.

Without being bound by any theory or explanation, the coating weight of the negative electrode film layer on single side within the above proper ranges is conducive to controlling a thickness of the negative electrode film layer within a proper range. As a result, the negative electrode plate can have proper migration paths for electrons and sodium ions and proper capacity. Therefore, using the negative electrode plate of the present application in a sodium-ion battery can allow the sodium-ion battery to have good rate performance and high energy density.

In some embodiments, the negative electrode film layer may satisfy: 30%≤P≤60%. Optionally, 45%≤P≤55%, in which P=[1−CW/(d*PA)]*100%, d=d$_0$/(1+E); CW represents a coating weight of the negative electrode film layer on single side; PA represents a true density of the negative electrode film layer on single side, and may be calculated as follows: PA=1/($\Sigma x_i/\rho_i$), where $x_i$ represents a mass ratio of the i$^{th}$ component that constitutes the negative electrode film layer in the negative electrode film layer, and $\rho_i$ represents a density of the i$^{th}$ component; E represents a percentage of elongation of the negative electrode current collector; and d$_0$ represents a thickness of the negative electrode film layer on single side.

Without being bound by any theory or explanation, the inventors have unexpectedly found, when the parameter P of the negative electrode film layer satisfies the above condition, it may be considered that the increase in the compaction density of the negative electrode film layer is mainly implemented by a sliding function of the second negative electrode active material particles in the cold pressing process, which has no significant impact on the porosity of the negative electrode film layer. As a result, not only the compaction density of the negative electrode film layer is increased, but also the infiltration of the negative electrode film layer by an electrolytic solution can be maintained, thereby ensuring that the secondary battery has high energy density and good rate performance.

The present application does not limit materials of the first negative electrode active material particles and the second negative electrode active material particles. In some embodiments, the first negative electrode active material particles may be selected from one or more of hard carbon, soft carbon, and mesocarbon microbeads (MCMB); and the second negative electrode active material particles may be selected from one or more of artificial graphite, natural graphite, and grapheme.

The particles selected from the above types of materials have mature production processes, facilitating processing of the first negative electrode active material particles and the second negative electrode active material particles that satisfy the conditions in the present application. Moreover, when the second negative electrode active material particles are selected from the aforementioned types of materials, the second negative electrode active material particles not only can fill the gaps among multiple first negative electrode active material particles or act on the surface of the first negative electrode active material particles to exert their sliding function, thereby enhancing the compaction density of the negative electrode active material, but also can possess excellent electron conductivity. As a result, the negative electrode plate of the present application can have a high compaction density and excellent electron conductivity, and when applied in sodium-ion batteries, it allows the sodium-ion batteries to have a high compaction density and good cycle performance.

Morphologies of the first negative electrode active material particles are not limited in the present application. In some embodiments, the first negative electrode active material particles may include one or more of irregularly shaped first negative electrode active material particles, spherical first negative electrode active material particles, or quasi-spherical first negative electrode active material particles.

In the negative electrode plate of the present application, the first negative electrode active material particles and the second negative electrode active material particles are combined and the contents of the first negative electrode active material particles and the second negative electrode active material particles are within the range of the present application, the negative electrode film layer can have a high compaction density regardless of the morphologies of the first negative electrode active material particles. This can improve the process flexibility of the negative electrode plate and allow the sodium-ion battery to have a high energy density.

In some embodiments, the first negative electrode active material particles may be hard carbon particles.

The inventors have found through research that hard carbon materials have lower energy storage voltage, higher capacity, and good cycling stability. In addition, the hard carbon materials have abundant sources and simple preparation processes. More importantly, the hard carbon particles per se have large lattice spacing and many pores, and therefore, are an ideal choice for the first negative electrode active material particles in the present application. Conventional hard carbon materials have high hardness and almost are not prone to deformation or sliding during cold pressing, and when they are applied to negative electrode film layers, compaction densities of the negative electrode film layers are usually low, but in the negative electrode film layer of the present application, the second negative electrode active material particles with a layered structure can fill the gaps among the first negative electrode active material particles or act on the surface of the first negative electrode active material particles to exert their sliding function, so the negative electrode film layer can still have a high compaction density without deformation of the first negative electrode active material particles. Therefore, when the first negative electrode active material particles are hard carbon particles, using the negative electrode plate of the present application in a sodium-ion battery can reduce the cost of the sodium-ion battery and improve the energy density, rate performance, and cycle stability of the sodium-ion battery.

In some embodiments, the first negative electrode active material particles may include one or more of irregularly shaped hard carbon particles, spherical hard carbon particles, or quasi-spherical hard carbon particles.

Without being bound by any theory or explanation, when the first negative electrode active material particles are selected from hard carbon particles having the aforementioned morphologies, they may enable the negative electrode active material particles to have a low cost and high theoretical gram capacity, thereby enhancing energy density, rate performance, and cycle stability of the sodium-ion batteries.

In some embodiments, the first negative electrode active material particles include one or more of irregularly shaped hard carbon particles, spherical hard carbon particles, or quasi-spherical hard carbon particles. The compaction density PD of the negative electrode film layer satisfies: 1.0 g/cm$^3$≤PD≤1.2 g/cm$^3$; the negative electrode film layer satisfies: 30%≤P≤60%, and optionally 45%≤P≤55%, where P=[1−CW/(d*PA)]*100%, d=d$_0$/(1+E), and CW represents a coating weight of the negative electrode film layer on single side; PA represents a true density of the negative electrode film layer on single side, and may be calculated as follows: PA=1/($\Sigma x_i/\rho_i$), where $x_i$ represents a mass ratio of the i$^{th}$ component that constitutes the negative electrode film layer in the negative electrode film layer, and $\rho_i$ represents a density of the i$^{th}$ component; E represents a percentage of elongation of the negative electrode current collector; and d$_0$ represents a thickness of the negative electrode film layer on single side.

Without being bound by any theory or explanation, when the parameter P of the negative electrode film layer satisfies the above condition, it may be considered that the increase in the compaction density of the negative electrode film layer is mainly implemented by a sliding function of the second negative electrode active material particles in the cold pressing process. Therefore, the negative electrode film layer can still have a high compaction density without deformation or sliding of the hard carbon particles. As a result, the hard carbon materials can be applied to a sodium-ion battery, so that the sodium-ion battery has a broad application prospect.

In some embodiments, the negative electrode film layer may further include a flexible binder, which includes one or more of a styrene-acrylic emulsion, a copolymer of vinylidene fluoride and tetrafluoroethylene, a copolymer of vinylidene fluoride and hexafluoropropylene, a copolymer of vinylidene fluoride and acrylate, polytetrafluoroethylene, nitrile butadiene rubber, and hydrogenated nitrile butadiene rubber.

Without being bound by any theory or explanation, the negative electrode film layer comprising the above flexible binder can have good flexibility. As a result, the negative electrode film layer can have smaller stress in the cold pressing process, the negative electrode active material particles are easier to accumulate, and the negative electrode current collector can have lower elongation. As a result, the compaction density of the negative electrode film layer can be further increased, thereby increasing the energy density of the sodium-ion battery.

In some embodiments, based on the total mass of the negative electrode film layer, the negative electrode film layer comprises: 80 wt % to 97 wt % of negative electrode active material particles, 0 wt % to 5 wt % of a conductive agent, 2 wt % to 10 wt % of a binder, and 0.5 wt % to 5 wt % of a dispersant, wherein the negative electrode active material particles include the first negative electrode active material particles and the second negative electrode active material particles.

Without being bound by any theory or explanation, the negative electrode film layer includes the aforementioned components, and the content of each component is within the aforementioned suitable range, which can ensure that the negative electrode film layer has a high compaction density and good transport performance of electrons and sodium ions. Thus, the negative electrode plate of the present application, when used in sodium-ion batteries, can allow the sodium-ion batteries to have high energy density and good cycle performance.

It should be noted that the parameters of the negative electrode film layer provided in the present application refer to ranges of parameters of the negative electrode film layer on single side. When the negative electrode film layers are disposed on two surfaces of the negative electrode current collector and wherein the parameters of the negative electrode film layer on either side satisfy the present application, it is considered to fall within the protection scope of the present application.

The first negative electrode active material particles in the present application may be obtained in various ways without limitation. For example, the first negative electrode active material particles may be purchased or self-made.

As an example, the first negative electrode active material particles may be irregularly shaped hard carbon particles. The first negative electrode active material particles may be prepared by the following steps: placing coconut shells at 300° C. for pre-carbonization; crushing the pre-carbonized coconut shells with a roller machine into particles having a diameter of about 2 mm, and removing impurities through screening; heating the particles at 400° C.-800° C., and optionally, introducing halogen or hydrogen halide gas to remove ash, so as to obtain particles that are suitable for ball milling; ball milling the particles to obtain carbon particles of Dv50=50 μm/40 μm/25 μm/20 μm/9 μm/5 μm/3 μm/1 μm; and placing and keeping the ball milled particles in an inert atmosphere at a temperature of 1150° C. for carbonization, and optionally, introducing acetylene gas may for coating the ball milled particles with vapor deposited carbon, so as to obtain the first negative electrode active material particles having irregular shapes.

As another example, the first negative electrode active material particles may be spherical hard carbon particles, or quasi-spherical hard carbon particles. The first negative electrode active material particles may be prepared by the following steps: dehydrating and carbonizing starch and/or lignin at 200° C. or less to obtain pre-carbonized particles with preliminarily fixed morphology (for example, pre-carbonized particles obtained from paper-making lignin, potato starch, corn starch, and rice starch have Dv50 of 50 μm, 25 μm, 10 μm, and 6 μm, respectively, and are spherical or quasi-spherical), and optionally, further adding a salt or polymer dehydrating agent containing N, P, S and halogen, such as an ammonium salt, a phosphate, a sulfate, a sulfite, a persulfate, a halide, or a polymer of the above salts into the starch and/or lignin; heating the pre-carbonized particles at 400-800° C. to obtain carbonized particles that are suitable for ball milling or jet mill crushing; the ball milling or jet mill crushing the carbonized particles to further obtain particles with other particle sizes that are in the shape of approximate spheres or cullet (for example, potato starch carbon particles with a particle size of 25 μm are subjected to first-stage ball milling to obtain 20 μm particles in the shape of approximate spheres and third-stage ball milling to obtain 5 μm particles in the shape of approximate cullet; rice starch with a particle size of 6 μm is subjected to first-stage ball milling to obtain 5 μm particles in the shape of approximate spheres and third-stage ball milling to obtain 1.5 μm particles in the shape of approximate cullet; and corn starch particles with a particle size of 10 μm are crushed with air flow to obtain 1 μm carbon particles in the shape of cullet); and the milled particles are placed in an inert atmosphere and held at a temperature of 1150° C. for carbonization, and optionally, acetylene gas may be introduced for vapor deposition carbon coating of the milled particles; as a result, the first negative electrode active material particles having spherical shape or the first negative electrode active material particles having quasi-spherical shape are obtained.

In the present application, the tap density has a well-known meaning in the art and may be measured by a method known in the art. For example, the tap density may be tested with a powder tap density tester (such as Bettersize BT-310) in accordance with standards GB/T 5162-2006 and GB/T 24533-2009.

In the present application, the median particle size has a well-known meaning in the art and may represent a particle size corresponding to a cumulative particle size distribution percentage of 50% of particles. The median particle size may be measured by a method and an instrument known in the art. For example, the median particle size may be measured by a laser particle size analyzer (such as Mastersizer 2000E) in accordance with the GB/T 19077-2016 particle size distribution laser diffraction method.

In the present application, the compaction density of the negative electrode film layer has a well-known meaning in the art and may be measured by a method known in the art. For example, after the negative electrode plate is cold-pressed, several wafers completely coated with slurry and wafers uncoated with slurry having an area of $S_1$ are punched out with a punching machine and weighed separately to obtain average weights $W_2$ and $W_1$, thicknesses of the wafers are measured separately to obtain average thicknesses $T_2$ and $T_1$, and a compaction density of the negative electrode film layer is $PD=(W_2-W_1)/(T_2-T_1)/S_1$.

In the present application, the percentage of elongation E of the negative electrode current collector has a well-known meaning in the art and may represent a length change rate of the negative electrode current collector in the negative electrode plate in a mechanical direction before and after cold pressing. The percentage of elongation E may be measured by a method and an instrument known in the art. For example, as shown in FIG. 1, a coated and dried negative electrode plate with a length of 2 m may be taken, and two mark points $A_1$ and $A_2$ are selected, where a line connecting $A_1$ and $A_2$ is parallel to a length direction of the negative electrode plate; the distance between the mark points $A_1$ and $A_2$ is accurately measured with a ruler, denoted as $L_1$; and after cold pressing on the negative electrode plate under certain pressure, the distance between $A_1$ and $A_2$ is measured, denoted as $L_2$, then $E=(L_2-L_1)/L_1$.

In the present application, the coating weight of the negative electrode film layer on single side has a well-known meaning in the art and may be measured by a method known in the art. For example, after the negative electrode plate is cold-pressed, several wafers completely coated with slurry and wafers uncoated with slurry having an area of $S_2$ are punched out with the punching machine and weighed separately to obtain average weights $M_2$ and $M_1$. The coating weight of the negative electrode plate on single side is $CW=(M_2-M_1)/nS_2$, wherein n represents the number of negative electrode film layers, n=1 when the negative electrode plate is coated on a single side, and n=2 when the negative electrode is coated on double sides.

In the present application, the thickness do of the negative electrode film layer on single side may be measured with a sub-micron micrometer. For example, after the negative electrode plate is cold-pressed, the thickness $d_1$ of the negative electrode plate may be measured with the sub-micron micrometer. After the negative electrode film layer on the surface of the negative electrode plate is scraped off and washed with a solvent, the thickness $d_4$ of the negative electrode current collector is measured with the sub-micron micrometer, $d_2=(d_1-d_2)/n$, where n represents the number of negative electrode film layers, n=1 when the negative electrode plate is coated on a single side, and n=2 when the negative electrode is coated on double sides.

In addition, the secondary battery, the battery module, the battery pack, and the electrical device of the present application will be described below with proper reference to the accompanying drawings.

Secondary Battery

A second aspect of the present application provides a secondary battery. In some embodiments, the secondary battery may be a sodium-ion battery.

Generally, a secondary battery includes a positive electrode plate, a negative electrode plate, an electrolyte and a separator. During charge and discharge processes of the battery, active ions are repeatedly intercalated and deintercalated between the positive electrode plate and the negative electrode plate. An electrolyte conducts ions between the positive electrode plate and the negative electrode plate. The separator is disposed between the positive electrode plate and the negative electrode plate, mainly preventing a short circuit between a positive electrode and a negative electrode while allowing ions to pass through.

[Positive Electrode Plate]

The positive electrode plate includes a positive electrode current collector and a positive electrode film layer disposed on at least one surface of the positive electrode current collector. The positive electrode film layer includes the positive electrode active material in the first aspect of the present application.

As an example, the positive electrode current collector has two opposite surfaces in its thickness direction, and the positive electrode film layer is disposed on either or both of the two opposite surfaces of the positive electrode current collector.

In some embodiments, the positive electrode current collector may be a metal foil or a composite current collector. For example, the metal foil may be an aluminum foil. The composite current collector may include a polymer material base layer and a metal layer formed on at least one surface of the polymer material base layer. The composite current collector may be formed by forming a metal material (aluminum, aluminum alloy, nickel, nickel alloy, titanium, titanium alloy, silver, silver alloy, or the like) on a polymer material base material (such as polypropylene (PP), polyethylene terephthalate (PET), polybutylene terephthalate (PBT), polystyrene (PS), or polyethylene (PE)).

In some embodiments, when the secondary battery is a sodium-ion battery, a positive electrode active material commonly known in the art for sodium-ion batteries may be used. As an example, one positive electrode active material may be used alone, or two or more positive electrode active materials may be used in combination. The positive electrode active material may be selected from sodium iron composite oxide ($NaFeO_2$), sodium cobalt composite oxide ($NaCoO_2$), sodium chromium composite oxide ($NaCrO_2$), sodium manganese composite oxide ($NaMnO_2$), sodium nickel composite oxide ($NaNiO_2$), sodium nickel titanium composite oxide ($NaNi_{1/2}Ti_{1/2}O_2$), sodium nickel manganese composite oxide ($NaNi_{1/2}Mn_{1/2}O_2$), sodium iron manganese composite oxide ($Na_{2/3}Fe_{1/3}Mn_{2/3}O_2$), sodium nickel cobalt manganese composite oxide ($NaNi_{1/3}Co_{1/3}Mn_{1/3}O_2$), sodium iron phosphate compound ($NaFePO_4$), sodium manganese phosphate compound ($NaMnPO_4$), sodium cobalt phosphate compound ($NaCoPO_4$), Prussian blue materials, polyanionic materials (phosphate, fluorophosphate, pyrophosphate, and sulfate), and the like. The present application is not limited to these materials, and other well-known materials conventionally used as positive electrode active materials for sodium-ion batteries may also be used in the present application.

In some embodiments, the positive electrode film layer may further optionally include a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin.

In some embodiments, the positive electrode film layer may further optionally include a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate may be manufactured by the following way: the foregoing components for manufacturing the positive electrode plate, such as the positive electrode active material, the conductive agent, the binder, and any other component(s), are dispersed in a solvent (such as N-methylpyrrolidone) to form a positive electrode slurry; and a positive electrode current collector is coated with the positive electrode slurry, and after processes including drying, cold pressing, and the like, the positive electrode plate may be obtained.

[Negative Electrode Plate]

The secondary battery of the present application includes the negative electrode plate in the first aspect of the present application.

The negative electrode plate includes a negative electrode current collector and a negative electrode film layer disposed on at least one surface of the negative electrode current collector.

The negative electrode film layer includes a negative electrode active material.

As an example, the negative electrode current collector has two opposite surfaces in its thickness direction, and the negative electrode film layer is disposed on either or both of the two opposite surfaces of the negative electrode current collector.

In some embodiments, the negative electrode current collector may be a metal foil or a composite current collector. For example, the metal foil may be a copper foil or an aluminum foil. The composite current collector may include a polymer material base layer and a metal layer formed on at least one surface of the polymer material base layer. The composite current collector may be formed by forming a metal material (copper, copper alloy, nickel, nickel alloy, titanium, titanium alloy, silver, silver alloy, or the like) on a polymer material base material (such as polypropylene (PP), polyethylene terephthalate (PET), polybutylene terephthalate (PBT), polystyrene (PS), or polyethylene (PE)).

In some embodiments, the negative electrode film layer may further optionally include a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer may further optionally include other auxiliaries, such as a thickener (carboxymethyl cellulose sodium (CMC-Na)).

In some embodiments, the negative electrode plate may be manufactured by the following way: the foregoing components for manufacturing the negative electrode plate, such as the first negative electrode active material particles, the second negative electrode active material particles, an optional sliding increment component, a conductive agent and a binder, and any other component(s), are dispersed in a solvent (such as deionized water) to form a negative electrode slurry; and a negative electrode current collector is coated with the negative electrode slurry, and after processes including drying, cold pressing, and the like, the negative electrode plate may be obtained.

[Electrolyte]

The electrolyte conducts ions between the positive electrode plate and the negative electrode plate. The type of the electrolyte is not specifically limited in the present application, and may be selected according to requirements. For example, the electrolyte may be liquid, colloidal, or all solid.

In some embodiments, the electrolyte is an electrolytic solution. The electrolytic solution includes an electrolyte salt and a solvent.

In some embodiments, the electrolyte salt may be selected from one or more of $NaPF_6$, $NaClO_4$, $NaBCl_4$, $NaSO_3CF_3$, and $Na(CH_3)C_6H_4SO_3$.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolytic solution may further optionally include additives. For example, the additives may include a negative electrode film-forming additive, a positive electrode film-forming additive, and additives that can improve some performances of the battery, such as an additive that improves overcharge performance of the battery and an additive that improves high-temperature or low-temperature performance of the battery.

[Separator]

In some embodiments, the secondary battery further includes a separator. The type of the separator is not specially limited in the present application. The separator may be any known porous separator with good chemical and mechanical stability.

In some embodiments, the material of the separator may be selected from at least one of glass fibers, a non-woven fabric, polyethylene, polypropylene, and polyvinylidene fluoride. The separator may be a single-layer thin film or a multi-layer composite thin film, without special limitations. When the separator is a multi-layer composite thin film, materials of various layers may be the same or different, without special limitations.

In some embodiments, the positive electrode plate, the negative electrode plate, and the separator may be manufactured into an electrode assembly through a winding process or a stacking process.

In some embodiments, the secondary battery may include an outer package. The outer package may be used for packaging the foregoing electrode assembly and electrolyte.

In some embodiments, the outer package of the secondary battery may be a hard shell, such as a hard plastic shell, an aluminum shell, or a steel shell. The outer package of the secondary battery may alternatively be a soft bag, such as a pocket type soft bag. A material of the soft bag may be plastic, for example polypropylene, polybutylene terephthalate, poly(butylene succinate), and the like.

Figure 2:
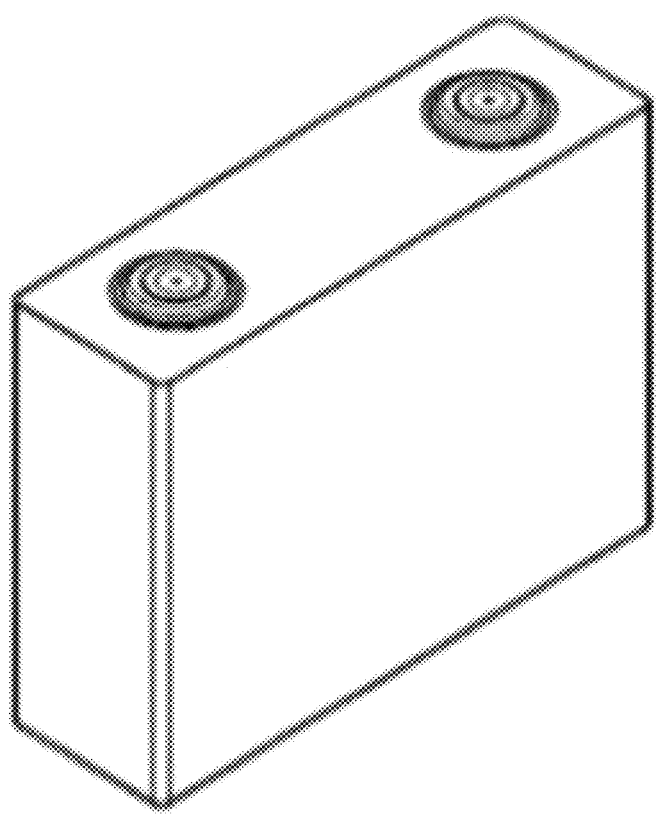
FIG. 2 is a schematic diagram of a secondary battery according to an embodiment of the present application.

The present application does not have particular limitation to a shape of the secondary battery. The secondary battery may have cylindrical shape, square shape, or other arbitrary shapes. For example, FIG. 2 shows a secondary battery 5 with a square structure as an example.

Figure 3:
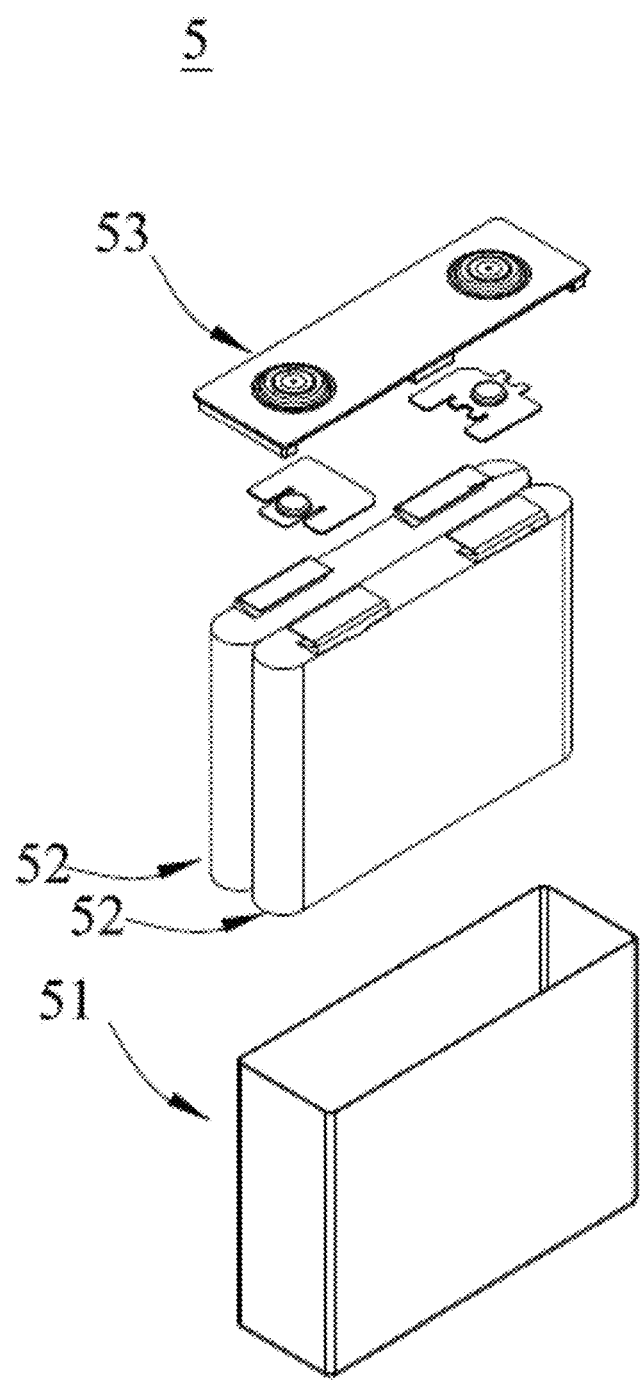
FIG. 3 is an exploded view of the secondary battery shown in FIG. 2 according to an embodiment of the present application.

In some embodiments, with reference to FIG. 3, the outer package may include a shell 51 and a cover plate 53. The shell 51 may include a bottom plate and side plates connected to the bottom plate, and the bottom plate and the side plates enclose to form an accommodating cavity. The shell 51 has an opening communicated with the accommodating cavity, and the cover plate 53 can cover the opening to close the accommodating cavity. The positive electrode plate, the negative electrode plate, and the separator may be wound or laminated to form an electrode assembly 52. The electrode assembly 52 is packaged in the accommodating cavity. The electrolytic solution infiltrates the electrode assembly 52. The secondary battery 5 includes one or more electrode assemblies 52, which may be determined by those skilled in the art according to actual requirements.

Battery Module and Battery Pack

In some embodiments, the secondary battery may be assembled into a battery module. The battery module may include one or more secondary batteries. The particular number of secondary batteries may be determined by those skilled in the art according to the application and capacity of the battery module.

Figure 4:
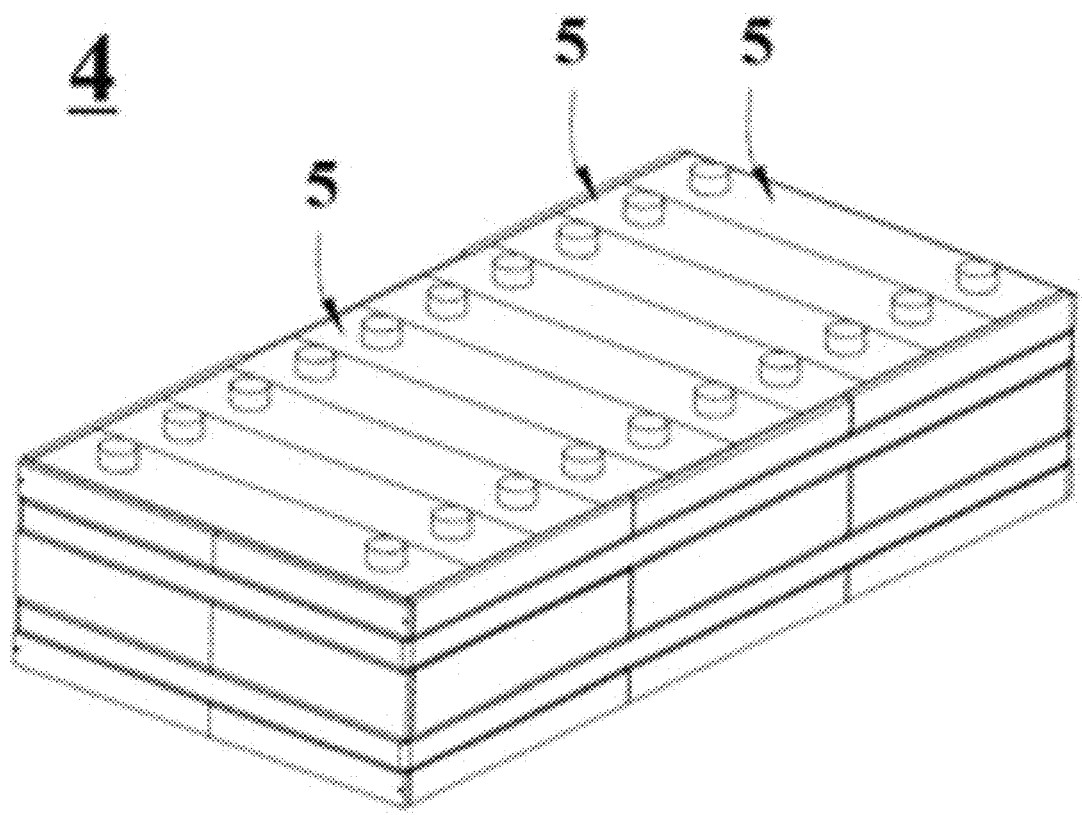
FIG. 4 is a schematic diagram of a battery module according to an embodiment of the present application.

FIG. 4 shows a battery module 4 as an example. With reference to FIG. 4, in the battery module 4, a plurality of secondary batteries 5 may be arranged sequentially in a length direction of the battery module 4. Apparently, the secondary batteries may alternatively be arranged in any other manner. Further, the plurality of secondary batteries 5 may be fixed by fasteners.

Optionally, the battery module 4 may further include a housing having an accommodating space, and the plurality of secondary batteries 5 are accommodated in the accommodating space.

In some embodiments, the foregoing battery module may be further assembled into a battery pack. The battery pack may include one or more battery modules. The particular number of battery modules may be determined by those skilled in the art according to the application and capacity of the battery pack.

Figure 5:
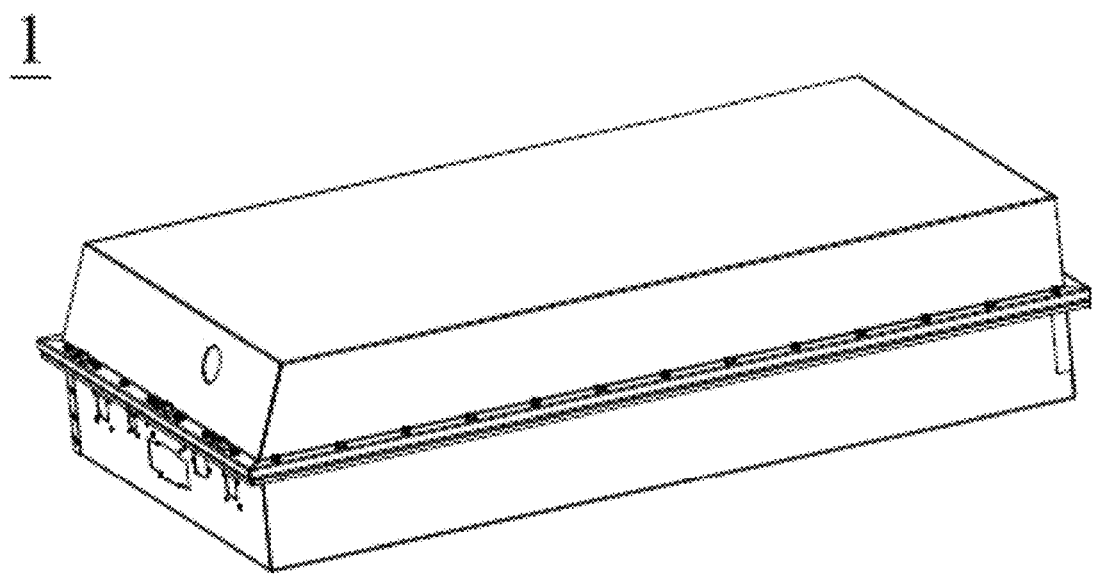
FIG. 5 is a schematic diagram of a battery pack according to an embodiment of the present application.
Figure 6:
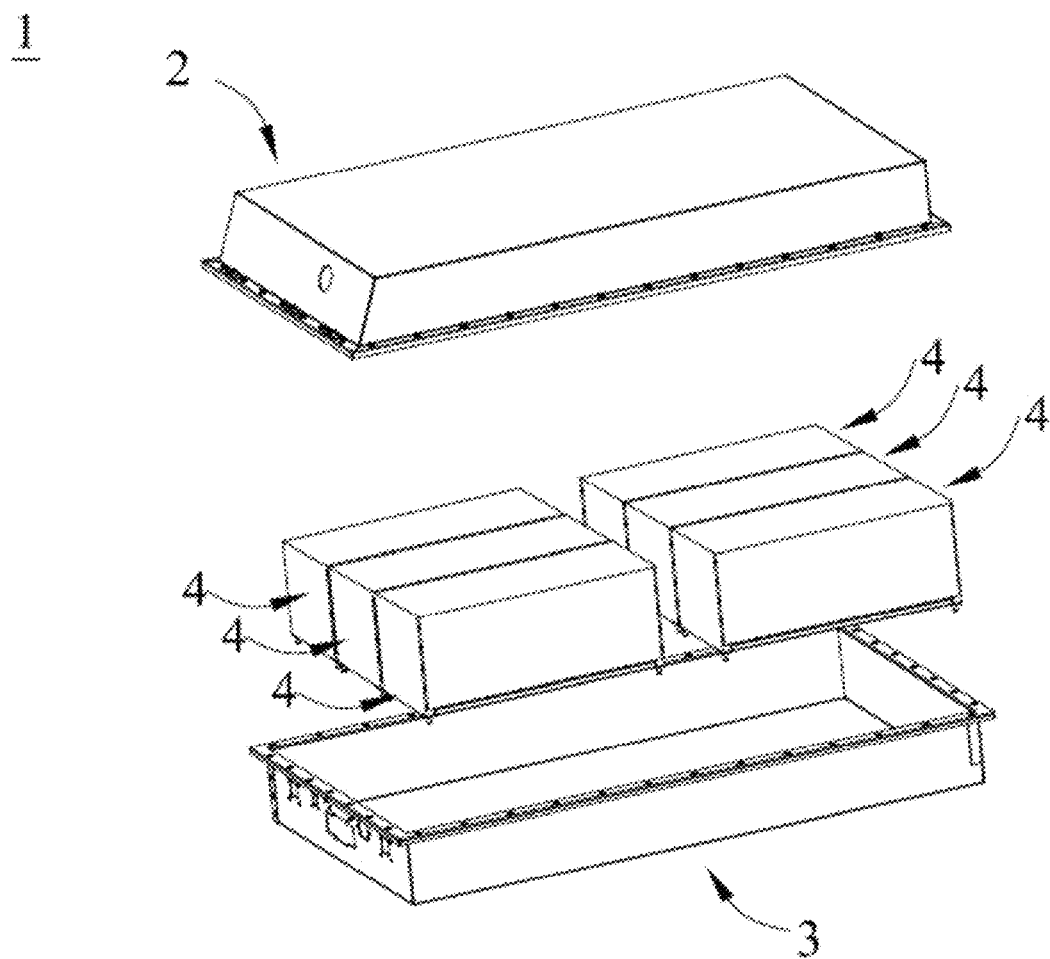
FIG. 6 is an exploded view of the battery pack shown in FIG. 5 according to an embodiment of the present application.

FIGS. 5 and 6 show a battery pack 1 as an example. With reference to FIGS. 5 and 6, the battery pack 1 may include a battery box and a plurality of battery modules 4 disposed in the battery box. The battery box includes an upper box 2 and a lower box 3. The upper box 2 can cover the lower box 3 to form a closed space for accommodating the battery modules 4. The plurality of battery modules 4 may be arranged in the battery box in any manner.

Electrical Device

In addition, the present application further provides an electrical device. The electrical device includes at least one of the secondary battery, the battery module, or the battery pack provided by the present application. The secondary battery, the battery module, or the battery pack may be used as a power source of the electrical device, or as an energy storage unit of the electrical device. The electrical device may be, but not limited to, a mobile device (such as a mobile phone or a notebook computer), an electric vehicle (such as a full electric vehicle, a hybrid electric vehicle, a plug-in hybrid electric vehicle, an electric bicycle, an electric scooter, an electric golf cart, or an electric truck), an electric train, a ship, a satellite, an energy storage system, or the like.

For the electrical device, the secondary battery, the battery module, or the battery pack may be selected according to its usage requirements.

Figure 7:
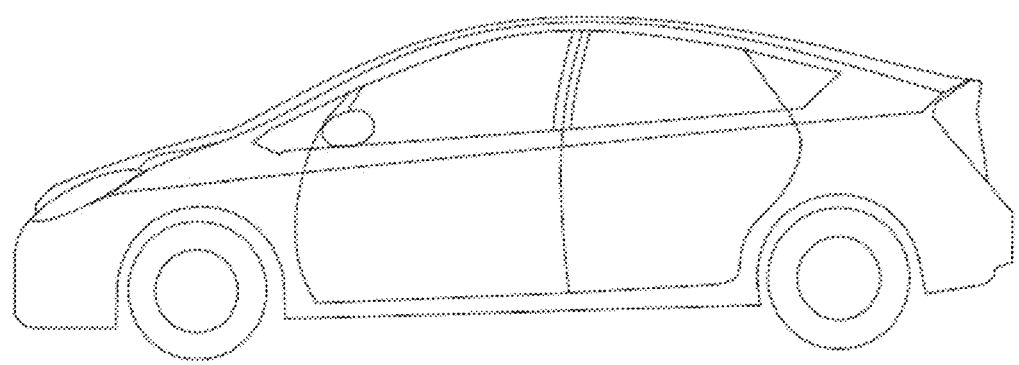
FIG. 7 is a schematic diagram of an electrical device using a secondary battery as a power source according to an embodiment of the present application.

FIG. 7 shows an electrical device as an example. The electrical device is a full electric vehicle, a hybrid electric vehicle, a plug-in hybrid electric vehicle, or the like. In order to meet the requirements of the electrical device for high power and high energy density of the secondary battery, the battery pack or the battery module may be used.

As another example, the device may be a mobile phone, a tablet computer, or a notebook computer. The device is generally required to be thin and light, so the secondary battery may be used as a power source.

EXAMPLES

Examples of the present application are described below. The examples described below are exemplary, are merely used for explaining the present application, and cannot be understood as limitations to the present application. Specific technologies or conditions that are not described in the examples are in accordance with the technologies or conditions described in the documents of this field or product specifications. Reagents or instruments not marked with manufacturers are all commercially available conventional products.

Example 1

1) Manufacturing of a Positive Electrode Plate

Sodium nickel manganese composite oxide ($NaNi_{1/2}Mn_{1/2}O_2$) as a positive electrode active material, acetylene black as a conductive agent, and polyvinylidene fluoride (PVDF) as a binder were fully mixed at a weight ratio of 92:5:3 in a proper amount of N-methylpyrrolidone (NMP) to form a uniform positive electrode slurry; and the positive electrode slurry was applied on a 13 μm thick aluminum foil as a positive electrode current collector; and after drying at 100° C. and pressing, a positive electrode plate was obtained.

2) Manufacturing of a Negative Electrode Plate

Negative electrode active material particles, acetylene black as a conductive agent, styrene-acrylic emulsion as a binder, and carboxymethylcellulose sodium (CMC-Na) as a thickener were fully mixed at weight ratio of 94:1:4:1 in a proper amount of deionized water to form a uniform negative electrode slurry; and the negative electrode slurry was applied on two sides of a 8 μm thick copper foil as a negative electrode current collector; and after drying at 100° C. and pressing, a negative electrode plate was obtained.

The negative electrode active material particles included first negative electrode active material particles and second negative electrode active material particles, the first negative electrode active material particles were hard carbon particles having irregular shapes, and the second negative electrode active material particles were artificial graphite particles, the first negative electrode active material particles had a median particle size D50 of 5 μm. Based on the total mass of the negative electrode active material particles, a mass percentage Q1 of the first negative electrode active material particles was 70% and a mass percentage Q2 of the second negative electrode active material particles was 30%. A coating weight CW of the negative electrode plate on single side was 9 mg/cm².

3) Separator

A polyethylene PE separator (celgard) was used.

4) Preparation of an Electrolytic Solution

Equal volumes of ethylene carbonate (EC) and propylene carbonate (PC) were mixed uniformly to obtain an organic solvent, and then $NaPF_6$ was uniformly dissolved in the above organic solvent to obtain an electrolytic solution, wherein $NaPF_6$ had a concentration of 1 mol/L.

5) Manufacturing of a Battery

The positive electrode plate, the separator, and the negative electrode plate were sequentially stacked. After adding the electrolytic solution and sealing, a sodium-ion battery was obtained.

Examples 2 to 6

Based on the manufacturing method in Example 1, $Q_1$ and $Q_2$ were adjusted to manufacture sodium-ion batteries in Examples 2 to 6.

Examples 7 to 14

Based on the manufacturing method in Example 1, the median particle size D50 of the first negative electrode active material particles, $Q_1$ and $Q_2$ were adjusted to manufacture sodium-ion batteries were adjusted to manufacture sodium-ion batteries in Examples 7 to 14.

Examples 15 to 16

Based on the manufacturing method in Example 1, the morphology of the first negative electrode active material particles, $Q_1$ and $Q_2$ were adjusted to manufacture sodium-ion batteries were adjusted to manufacture sodium-ion batteries in Examples 15 to 16.

Examples 17 to 19

Based on the manufacturing method in Example 1, the type of the second negative electrode active material particles, $Q_1$ and $Q_2$ were adjusted to manufacture sodium-ion batteries in Examples 17 to 19, in which natural graphite was used as the second negative electrode active material particles in Example 17, graphene was used as the second negative electrode active material particles in Example 18, and a mixture of natural graphite and graphene at a mass ratio of 1:1 was used as the second negative electrode active material particles in Example 19.

Examples 20 to 23

Based on the manufacturing method in Example 1, the coating weight of the negative electrode film layer on single side, $Q_1$ and $Q_2$ were adjusted to manufacture sodium-ion batteries in Examples 20 to 23.

Examples 24 to 27

Based on the manufacturing method in Example 1, the tap density of the first negative electrode active material particles, $Q_1$ and $Q_2$ were adjusted to manufacture sodium-ion batteries in Examples 24 to 27.

Examples 28 to 29

Based on the manufacturing method in Example 1, the tap density of the second negative electrode active material particles, $Q_1$ and $Q_2$ were adjusted to manufacture sodium-ion batteries in Examples 28 to 29.

Examples 30 to 34

Based on the manufacturing method in Example 1, $Q_1$, $Q_2$ and the type of the binder for the negative electrode plate were adjusted to manufacture sodium-ion batteries in Examples 30 to 34 in which styrene butadiene rubber (SBR) was used as the binder used for the negative electrode plate in Example 30; hydrogenated nitrile butadiene rubber was used as the binder used for the negative electrode plate in Example 31; a copolymer of vinylidene fluoride and hexafluoropropylene was used as the binder used for the negative electrode plate in Example 32; a copolymer of vinylidene fluoride and acrylate was used as the binder used for the negative electrode plate in Example 33; and polytetrafluoroethylene was used as the binder used for the negative electrode plate in Example 34.

Comparative Examples 1 to 3

Based on the manufacturing method in Example 1, the composition of the negative electrode active material particles was adjusted to manufacture sodium-ion batteries in Comparative Examples 1 to 3 in which the negative electrode active material particles of Comparative Example 1 were consisted of irregularly shaped hard carbon particles having D50=5 μm, the negative electrode active material particles of Comparative Example 2 were consisted of spherical hard carbon particles having D50=5 μm, and the negative electrode active material particles of Comparative Example 3 were consisted of quasi-spherical hard carbon particles having D50=5 μm, Comparative Examples 4-5

Based on the manufacturing method in Example 1, $Q_1$ and $Q_2$ were adjusted to manufacture sodium-ion batteries in Comparative Examples 4 to 5.

The preparation parameters for the negative electrode plates of Examples 1-34 and Comparative Examples 1-5 were as shown in Table 1 below in which Q1 represents a mass percentage of the first negative electrode active material particles based on the total mass of the negative electrode active material particles; Q2 represents a mass percentage of the second negative electrode active material particles based on the total mass of the negative electrode active material particles; the tap density ρ1 and D50 of the first negative electrode active material particles, and the tap density ρ2 of the second negative electrode active material particles may be tested according to the methods described above in the description, and PA may be calculated according to the methods described above in the description.

The test parameters for the negative electrode plates of Examples 1-34 and Comparative Examples 1-5 were as shown in Table 2 below in which CW, do, E, and PD may be tested according to the methods described above in the description, and P may be calculated according to the methods described above in the description.

Figure 8:
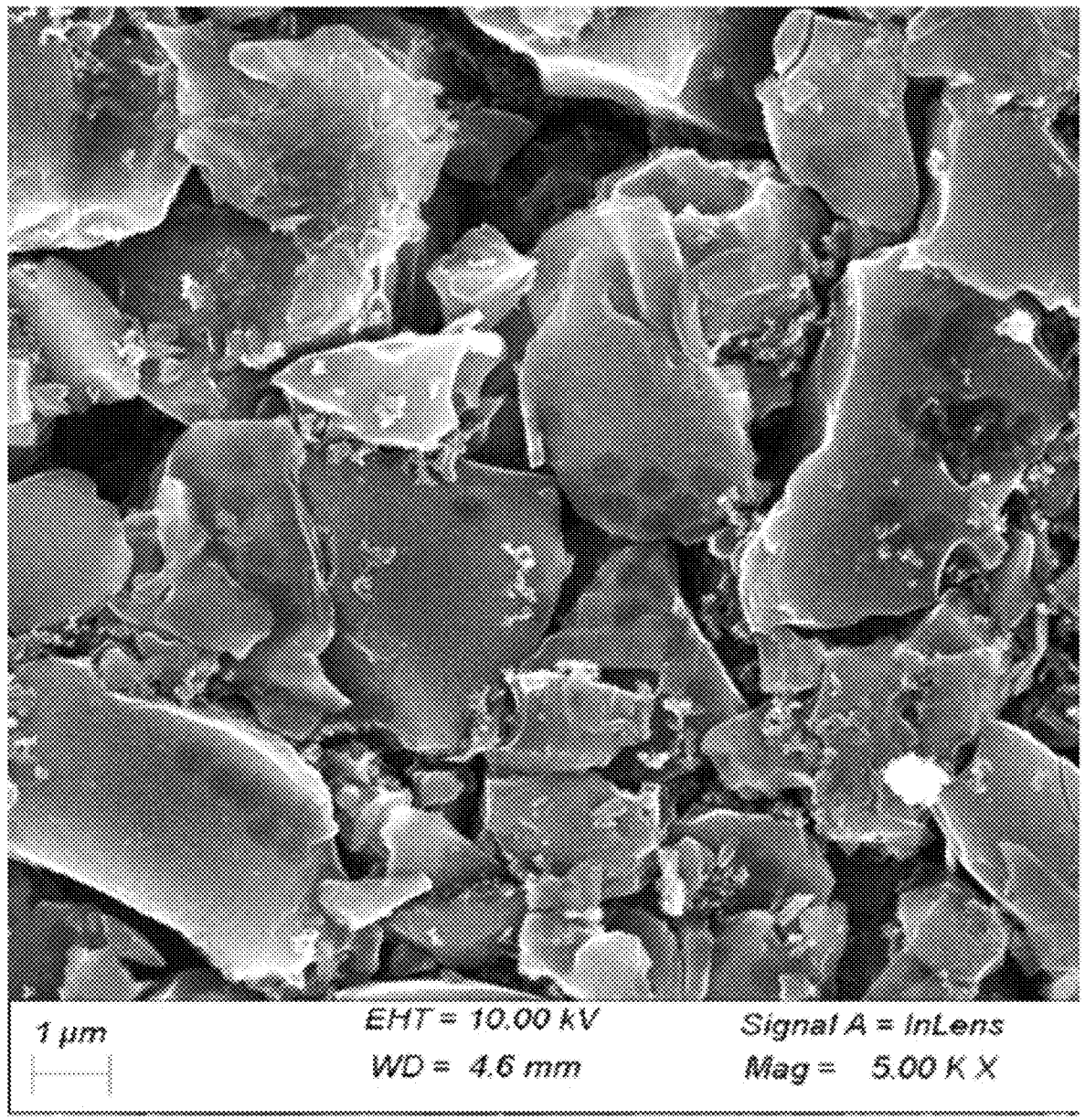
FIG. 8 is a scanning electron microscope (SEM) image of a negative electrode plate in Example 1 of the present application.

A SEM test was conducted on the negative electrode plate of Example 1, and the resulting SEM image was shown in FIG. 8.

TABLE 1

Manufacturing parameters of the negative electrode plates in Examples 1-34 and Comparative Examples 1-5

| No. | $\rho_1$/ | $Q_1$/% | D50/μm | $\rho_2$/ | $Q_2$/% | PA/ |
|---|---|---|---|---|---|---|
| Example 1 | 0.85 | 70 | 5 | 1.15 | 30 | 2.07 |
| Example 2 | 0.85 | 75 | 5 | 1.15 | 25 | 2.07 |
| Example 3 | 0.85 | 80 | 5 | 1.15 | 20 | 2.07 |
| Example 4 | 0.85 | 85 | 5 | 1.15 | 15 | 2.07 |
| Example 5 | 0.85 | 90 | 5 | 1.15 | 10 | 2.07 |
| Example 6 | 0.85 | 95 | 5 | 1.15 | 5 | 2.07 |
| Example 7 | 0.85 | 90 | 1 | 1.15 | 10 | 2.07 |
| Example 8 | 0.85 | 90 | 3 | 1.15 | 10 | 2.07 |
| Example 9 | 0.85 | 90 | 8 | 1.15 | 10 | 2.07 |
| Example 10 | 0.85 | 90 | 10 | 1.15 | 10 | 2.07 |
| Example 11 | 0.85 | 90 | 20 | 1.15 | 10 | 2.07 |
| Example 12 | 0.85 | 90 | 30 | 1.15 | 10 | 2.07 |
| Example 13 | 0.85 | 90 | 50 | 1.15 | 10 | 2.07 |
| Example 14 | 0.85 | 90 | 60 | 1.15 | 10 | 2.07 |
| Example 15 | 0.85 | 90 | 5 | 1.15 | 10 | 2.07 |
| Example 16 | 0.85 | 90 | 5 | 1.15 | 10 | 2.07 |
| Example 17 | 0.85 | 90 | 5 | 1.15 | 10 | 2.07 |
| Example 18 | 0.85 | 90 | 5 | 0.4 | 10 | 2.07 |
| Example 19 | 0.85 | 90 | 5 | 1.15 | 10 | 2.07 |
| Example 20 | 0.85 | 90 | 5 | 1.15 | 10 | 2.07 |
| Example 21 | 0.85 | 90 | 5 | 1.15 | 10 | 2.07 |
| Example 22 | 0.85 | 90 | 5 | 1.15 | 10 | 2.07 |
| Example 23 | 0.85 | 90 | 5 | 1.15 | 10 | 2.07 |
| Example 24 | 0.4 | 90 | 5 | 1.15 | 10 | 2.07 |
| Example 25 | 0.6 | 90 | 5 | 1.15 | 10 | 2.07 |
| Example 26 | 1.0 | 90 | 5 | 1.15 | 10 | 2.07 |
| Example 27 | 1.4 | 90 | 5 | 1.15 | 10 | 2.07 |
| Example 28 | 0.85 | 85 | 5 | 0.7 | 15 | 2.07 |
| Example 29 | 0.85 | 85 | 5 | 1.3 | 15 | 2.07 |
| Example 30 | 0.85 | 85 | 5 | 1.15 | 15 | 2.07 |
| Example 31 | 0.85 | 85 | 5 | 1.15 | 15 | 2.07 |
| Example 32 | 0.85 | 85 | 5 | 1.15 | 15 | 2.07 |
| Example 33 | 0.85 | 85 | 5 | 1.15 | 15 | 2.07 |
| Example 34 | 0.85 | 85 | 5 | 1.15 | 15 | 2.07 |
| Comparative | 0.85 | 100 | 5 | 1.15 | 0 | 2.07 |
| Comparative | 0.85 | 100 | 5 | 1.15 | 0 | 2.07 |
| Comparative | 0.85 | 100 | 5 | 1.15 | 0 | 2.07 |
| Comparative | 0.85 | 50 | 5 | 1.15 | 50 | 2.07 |
| Comparative | 0.85 | 98 | 5 | 1.15 | 2 | 2.07 |

TABLE 2

Test parameters of the negative electrode plates in Examples 1-34 and Comparative Examples 1-5

| No. | CW/(mg/cm$^2$) | $d_0$/μm | E/% | PD/(g/cm$^3$) | P/% |
|---|---|---|---|---|---|
| Example 1 | 9 | 85.7 | 0.12 | 1.05 | 48.8% |
| Example 2 | 9 | 86.5 | 0.12 | 1.04 | 49.3% |
| Example 3 | 9 | 87.4 | 0.12 | 1.03 | 49.8% |
| Example 4 | 9 | 88.2 | 0.12 | 1.02 | 50.2% |
| Example 5 | 9 | 89.1 | 0.12 | 1.01 | 50.7% |
| Example 6 | 9 | 90.0 | 0.12 | 1.00 | 51.2% |
| Example 7 | 9 | 91.8 | 0.12 | 0.98 | 52.2% |
| Example 8 | 9 | 90.9 | 0.12 | 0.99 | 51.7% |
| Example 9 | 9 | 89.1 | 0.12 | 1.01 | 50.7% |
| Example 10 | 9 | 88.2 | 0.12 | 1.02 | 50.2% |
| Example 11 | 9 | 86.5 | 0.12 | 1.04 | 49.3% |
| Example 12 | 9 | 84.1 | 0.12 | 1.07 | 47.8% |
| Example 13 | 9 | 82.6 | 0.12 | 1.09 | 46.8% |
| Example 14 | 9 | 85.7 | 0.12 | 1.05 | 48.8% |
| Example 15 | 9 | 78.3 | 0.12 | 1.15 | 43.9% |
| Example 16 | 9 | 78.3 | 0.12 | 1.15 | 43.9% |
| Example 17 | 9 | 89.1 | 0.12 | 1.01 | 50.7% |
| Example 18 | 9 | 89.1 | 0.12 | 1.01 | 50.7% |
| Example 19 | 9 | 89.1 | 0.12 | 1.01 | 50.7% |
| Example 20 | 3 | 28.6 | 0.12 | 1.05 | 48.8% |
| Example 21 | 5 | 48.5 | 0.12 | 1.03 | 49.8% |
| Example 22 | 7 | 68.6 | 0.12 | 1.02 | 50.2% |
| Example 23 | 13 | 132.7 | 0.12 | 0.98 | 52.2% |
| Example 24 | 9 | 91.8 | 0.12 | 0.98 | 52.2% |
| Example 25 | 9 | 90.0 | 0.12 | 1.00 | 51.2% |
| Example 26 | 9 | 89.1 | 0.12 | 1.01 | 50.7% |
| Example 27 | 9 | 88.2 | 0.12 | 1.02 | 50.2% |
| Example 28 | 9 | 89.1 | 0.12 | 1.01 | 50.7% |
| Example 29 | 9 | 89.1 | 0.12 | 1.01 | 50.7% |
| Example 30 | 9 | 95.7 | 0.9 | 0.94 | 54.1% |
| Example 31 | 9 | 89.1 | 0.12 | 1.01 | 50.4% |
| Example 32 | 9 | 89.1 | 0.12 | 1.01 | 50.8% |
| Example 33 | 9 | 89.1 | 0.12 | 1.01 | 50.8% |
| Example 34 | 9 | 89.1 | 0.12 | 1.01 | 50.8% |
| Comparative Example 1 | 9 | 105.9 | 1.6 | 0.85 | 58.6% |
| Comparative Example 2 | 9 | 90.0 | 0.3 | 1.00 | 51.2% |
| Comparative Example 3 | 9 | 91.8 | 0.3 | 0.98 | 51.2% |
| Comparative Example 4 | 9 | 81.8 | 0.12 | 1.10 | 46.4% |
| Comparative Example 5 | 9 | 103.4 | 1.5 | 0.87 | 57.6% |

In addition, performances of the sodium-ion batteries obtained in Examples 1-34 and Comparative Examples 1-5 above were tested. The test results were shown in Table 3 below.

(1) Energy Density Test

At 25° C., a secondary battery was charged at a constant current rate of 0.33 C to a voltage of 4.2 V, then charged with the constant voltage of 4.2 V to a current of 0.05 C to reach a full charge state, stood for 5 min, discharged at the constant current rate of 0.33 C to a voltage of 2.5 V, and stood again for 5 min, a capacity and voltage platform of the secondary battery at the constant current discharge rate of 0.33 C were recorded, and a mass of the secondary battery was finally measured.

Energy density of the secondary battery (Wh/kg)=(capacity of the secondary battery at the constant current discharge rate of 0.33 C×voltage platform of the secondary battery at the constant current discharge rate of 0.33 C)/mass of the secondary battery.

(2) Cycle Life Test

At 25° C., the secondary battery was charged at a constant current rate of 1/3 C to 4.2 V, then charged with the constant voltage of 4.2 V to a current of 0.05 C, stood for 5 min, and discharged at 1/3 C to 2.8 V, and the obtained capacity was recorded as initial capacity $C_0$. The above steps were repeated for the same battery, and the discharge capacity $C_n$ of the battery after the $n^{th}$ cycle was recorded. A battery capacity retention rate after each cycle was $P_n = C_n/C_0 * 100\%$, and the minimum n value corresponding to $P_n \leq 80\%$ was used as the cycle life of the secondary battery.

TABLE 3

Performance test results in Examples 1-45 and Comparative Examples 1-3

| No. | Energy density, Wh/kg | Cycle life/cycles |
|---|---|---|
| Example 1 | 112 | 1902 |
| Example 2 | 112 | 1911 |
| Example 3 | 113 | 1912 |
| Example 4 | 113 | 1900 |
| Example 5 | 114 | 1984 |
| Example 6 | 114 | 1978 |
| Example 7 | 113.5 | 1650 |
| Example 8 | 113.5 | 1866 |
| Example 9 | 114 | 1900 |
| Example 10 | 114 | 1901 |
| Example 11 | 114.5 | 1904 |
| Example 12 | 114.5 | 1811 |
| Example 13 | 115 | 1764 |
| Example 14 | 115 | 1065 |
| Example 15 | 117 | 1795 |
| Example 16 | 117 | 1790 |
| Example 17 | 114 | 1997 |
| Example 18 | 114 | 1980 |
| Example 19 | 114 | 1998 |
| Example 20 | 40 | 1993 |
| Example 21 | 60 | 1996 |
| Example 22 | 95 | 1992 |
| Example 23 | 140 | 1805 |
| Example 24 | 113.5 | 1945 |
| Example 25 | 114 | 1954 |
| Example 26 | 114 | 1930 |
| Example 27 | 114.5 | 1923 |
| Example 28 | 114 | 1941 |
| Example 29 | 114 | 1925 |
| Example 30 | 114 | 1911 |
| Example 31 | 114 | 1797 |
| Example 32 | 114 | 1691 |
| Example 33 | 114 | 1696 |
| Example 34 | 114 | 1593 |
| Comparative Example 1 | 84 | 1021 |
| Comparative Example 2 | 113 | 1322 |
| Comparative Example 3 | 113 | 1209 |
| Comparative Example 4 | 30 | 589 |
| Comparative Example 5 | 84 | 1330 |

From the comprehensive analysis of Examples 1 to 34, it can be seen that when the negative electrode film layer includes the first negative electrode active material particles and the second negative electrode active material particles, and the first and second negative electrode active material particles meet the conditions of the present application, it is possible to enable the negative electrode film layer to have a high compaction density and an appropriate parameter P, and also to enable the sodium-ion battery to have both high energy density and long cycle life. As shown in FIG. 8, the second negative electrode active material particles can fill the gaps among the first negative electrode active material particles or act on the surface of the first negative electrode active material particles, to exert a sliding function during a cold pressing process. Thus, the negative electrode film layer can achieve a high compaction density.

Specifically, from the comprehensive analysis of Examples 1 to 6, it can be understood that when other conditions are the same, the higher the content of the first negative electrode active material particles and the lower the content of the second negative electrode active material particles, the higher the energy density of the sodium-ion battery is; the lower the content of the first negative electrode active material particles and the higher the content of the second negative electrode active material particles, the higher the compaction density of the negative electrode film layer is. Excessively high compaction density may affect infiltration of the negative electrode film layer by an electrolytic solution; excessively low compaction density may affect the transport performance of electrons and sodium ions in the negative electrode film layer. Therefore, it is needed to control the content of the first negative electrode active material particles and the second negative electrode active material particles within an appropriate range.

From the comprehensive analysis of Examples 5, 7 to 14, it can be seen that when other conditions are the same, as the median particle size D50 of the first negative electrode active material particles increases, the cycle life of the sodium-ion battery first increases and then decreases. This may be relevant to the number of active sites on the surface of the first negative electrode active material particles and the specific surface area of the first negative electrode active material particles.

From the comprehensive analysis of Examples 5, 15 to 16, it can be seen that when other conditions are the same, compared to Example 5, Examples 15 to 16 adopting spherical hard carbon particles or quasi-spherical hard carbon particles as the first negative electrode active material particles have a higher compaction density of the negative electrode film layer, but the corresponding sodium-ion batteries have a shorter cycle life. This may be because the infiltration of the negative electrode film layer by the electrolytic solution in Examples 15 to 16 is reduced compared to that in Example 5.

From the comprehensive analysis of Examples 5, 17 to 19, it can be seen that the second negative electrode active material particles with a layered structure can all exert a sliding function, thereby increasing the compaction density of the negative electrode film layer.

From the comprehensive analysis of Examples 5, 20 to 23, it can be seen that when other conditions are the same, the higher the coating weight of the negative electrode film layer on single side, the lower the compaction density of the negative electrode film layer is. This may be because when the negative electrode film layer is thicker, the sliding function of the second negative electrode active material particles under pressure is limited during the cold pressing process.

From the comprehensive analysis of Examples 5, 24 to 27, it can be seen that when other conditions are the same, as the tap density of the first negative electrode active material particles increases, the compaction density of the negative electrode film layer also increases, and the cycle life of the sodium-ion battery decreases accordingly. This may be because the quantity of adsorption pores within the first negative electrode active material particles decreases as the tap density of the first negative electrode active material particles increases, thereby allowing the negative electrode film layer to have a higher compaction density. Correspondingly, as the quantity of adsorption pores within the first negative electrode active material particles decreases, the space for the storage of sodium within the first negative electrode active material particles also decreases, thereby shortening the cycle life of the sodium-ion battery.

From the comprehensive analysis of Examples 5, 28 to 29, it can be seen that when the tap density of the second negative electrode active material particles is within the appropriate range, it is possible to enable the negative electrode film layer to have a high compaction density, and to make the sodium-ion battery have a higher compaction density and a longer cycle life.

From the comprehensive analysis of Examples 5, 30 to 34, it can be seen that compared to the conventional negative electrode binder SBR, a flexible binder can increase the compaction density of the negative electrode film layer, improve the long-term cycle performance of sodium-ion batteries, and enhance the energy density and cycle life of sodium-ion batteries.

In contrast, only hard carbon particles with a median particle size of 5 μm and different morphologies are used as the negative electrode active material particles in Comparative Examples 1 to 3, and the resulting negative electrode film layer has a lower compaction density. As a result, the negative electrode plate not only has a lower energy density but also longer transport paths of electrons and sodium ions. Thus the resulting sodium-ion battery has a lower energy density and cycle life. Although a combination of the first negative electrode active material particles and the second negative electrode active material particles with a layered structure was used In Comparative Examples 4 and 5, the content of the first negative electrode active material particles was lower than the range specified in the present application in Comparative Example 4, thereby significantly reducing the energy density of the sodium-ion battery; and the content of the first negative electrode active material particles was higher than the range specified in this application in Comparative Example 5, and the second negative electrode active material particles have a limited effect on improving the compaction density of the negative electrode film layer. Thus, the energy density and cycle life of the sodium-ion battery in Comparative Example 5 are also not ideal.

It should be noted that the present application is not limited to the foregoing embodiments. The foregoing embodiments are only examples, and all embodiments within the scope of the technical solution of the present application that have substantially the same composition and effects as the technical concept fall within the technical scope of the present application. Moreover, various variations that can be conceived by those skilled in the art and other embodiments constituted by combining some elements of the embodiments without departing from the scope of the main purpose of the present application are further included in the scope of the present application.

What is claimed is:

1. A negative electrode plate, comprising:
a negative electrode current collector; and
a negative electrode film layer, wherein the negative electrode film layer is located on at least one surface of the negative electrode current collector, the negative electrode film layer comprises first negative electrode active material particles and second negative electrode active material particles, the first negative electrode active material particles comprise a plurality of adsorption holes and have a tap density of 0.4 g/cm$^3$-1.4 g/cm$^3$, and optionally 0.6 g/cm$^3$-1.0 g/cm$^3$, and the second negative electrode active material particles have a layered structure, and have a tap density of 0.05 g/cm$^3$-1.5 g/cm$^3$,
wherein:
based on a total mass of the first negative electrode active material particles and the second negative electrode active material particles, a mass percentage of the first negative electrode active material particles is 70%-95% and optionally 80%-95%, and a mass percentage of the second negative electrode active material particles is 5%-30% and optionally 5%-10%, and
the negative electrode film layer has a compaction density PD satisfying: 0.8 g/cm$^3$≤PD≤1.3 g/cm$^3$, and optionally 1.0 g/cm$^3$≤PD≤1.2 g/cm$^3$.

2. The negative electrode plate according to claim 1, wherein the first negative electrode active material particles have a median particle size D50 of 1 μm-50 μm, and optionally 5 μm-10 μm.

3. The negative electrode plate according to claim 1, wherein the negative electrode current collector has a percentage of elongation E satisfying: 0.1%≤E≤0.2%, and optionally 0.1%≤E≤0.15%.

4. The negative electrode plate according to claim 1, wherein a coating weight of the negative electrode film layer on single side is from 2 mg/cm$^2$ to 13 mg/cm$^2$.

5. The negative electrode plate according to claim 1, wherein the negative electrode film layer satisfies: 30%≤P≤60%, and optionally 45%≤P≤55%,
in which P=[1−(CW)/(d*PA)]*100%, d=$d_0$/(1+E), CW represents a coating weight of the negative electrode film layer on single side, PA represents a true density of the negative electrode film layer on single side, E represents a percentage of elongation of the negative electrode current collector; and $d_0$ represents a thickness of the negative electrode film layer on single side.

6. The negative electrode plate according to claim 1, wherein the first negative electrode active material particles are selected from one or more of hard carbon, soft carbon, and mesophase carbon microbeads; and the second negative electrode active material particles are selected from one or more of artificial graphite, natural graphite, and graphene.

7. The negative electrode plate according to claim 1, wherein the first negative electrode active material particles comprises one or more of irregularly shaped first negative electrode active material particles, spherical first negative electrode active material particles, or quasi-spherical first negative electrode active material particles.

8. The negative electrode plate according to claim 1, wherein the first negative electrode active material particles comprises one or more of irregularly shaped hard carbon particles, spherical hard carbon particles, or quasi-spherical hard carbon particles.

9. The negative electrode plate according to claim 8, wherein:
the compaction density PD of the negative electrode film layer on single side satisfies: 1.0 g/cm$^3$≤PD≤1.2 g/cm$^3$; and
the negative electrode film layer satisfies: 30%≤P≤60%, and optionally 45%≤P≤55%, wherein P=[1−(CW)/(d*PA)]*100%, d=$d_0$/(1+E), CW represents a coating weight of the negative electrode film layer on single side, PA represents a true density of the negative electrode film layer on single side, E represents a percentage of elongation of the negative electrode current collector; and $d_0$ represents a thickness of negative electrode film layer on single side.

10. The negative electrode plate according to claim 1, wherein the negative electrode film layer further comprises a flexible binder, the flexible binder comprises one or more of a styrene-acrylic emulsion, a copolymer of vinylidene fluoride and tetrafluoroethylene, a copolymer of vinylidene fluoride and hexafluoropropylene, a copolymer of vinylidene fluoride and acrylate, polytetrafluoroethylene, nitrile butadiene rubber, and hydrogenated nitrile butadiene rubber.

11. The negative electrode plate according to claim 1, wherein based on a total mass of the negative electrode film layer, the negative electrode film layer comprises: 80 wt. %-97 wt. % of negative electrode active material particles, 0 wt. %-5 wt. % of a conductive agent, 2 wt %-10 wt. % of a binder, and 0.5 wt %-5 wt. % of a dispersant, wherein the negative electrode active material particles comprises the first negative electrode active material particles and the second negative electrode active material particles.

12. A secondary battery, comprising the negative electrode plate according to claim 1.

13. A battery module, comprising the secondary battery according to claim 12.

14. A battery pack, comprising the battery module according to claim 13.

15. An electrical device, comprising the secondary battery according to claim 12.

* * * * *